United States Patent
Lee (10) Patent No.: US 8,031,439 B2
(45) Date of Patent: Oct. 4, 2011

(54) HEAD STACK ASSEMBLY INCLUDING A SWING ARM HAVING A BOBBIN AND A PRINTED CIRCUIT BOARD WITH CONDUCTIVE TRACES ATTACHED TO THE BOBBIN, AND HARD DISK DRIVE COMPRISING THE SAME

(75) Inventor: Chul-Woo Lee, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 987 days.

(21) Appl. No.: 11/942,762

(22) Filed: Nov. 20, 2007

(65) Prior Publication Data

US 2008/0137234 A1 Jun. 12, 2008

(30) Foreign Application Priority Data

Dec. 11, 2006 (KR) .......................... 10-2006-0125348

(51) Int. Cl.
*G11B 5/55* (2006.01)
(52) U.S. Cl. ...................... 360/264.7; 360/265
(58) Field of Classification Search ............... 360/264.7, 360/265
See application file for complete search history.

(56) References Cited

U.S. PATENT DOCUMENTS

| 5,764,440 | A | * | 6/1998 | Forbord | 360/265 |
| 6,104,581 | A | | 8/2000 | Huang et al. | |
| 6,678,121 | B2 | * | 1/2004 | Lee et al. | 360/265 |

FOREIGN PATENT DOCUMENTS

| JP | 59-159658 | 9/1984 |
| JP | 62-077048 | 4/1987 |
| JP | 04-264703 | 9/1992 |

* cited by examiner

*Primary Examiner* — A. J. Heinz
(74) *Attorney, Agent, or Firm* — Volentine & Whitt, PLLC (57) ABSTRACT

The head stack assembly of a hard disk drive includes a bobbin, and a printed circuit board attached to the bobbin. The bobbin forms an end of the head stack assembly that is rotatable about an axis of a shaft. The printed circuit board has a flat conductive pattern of a plurality of traces through which current is supplied. The conductive pattern constitutes the voice coil motor of the hard disk drive. The hard disk drive has magnets disposed above and below the bobbin, respectively, to generate a magnetic field across the conductive pattern such that an electromotive force that rotates the HSA is produced when current flows through the conductive pattern. The flat conductive pattern allows the voice coil motor to be relatively thin while the magnets need to encompass only a small region making the hard disk drive compact and lightweight.

15 Claims, 9 Drawing Sheets

HEAD STACK ASSEMBLY INCLUDING A SWING ARM HAVING A BOBBIN AND A PRINTED CIRCUIT BOARD WITH CONDUCTIVE TRACES ATTACHED TO THE BOBBIN, AND HARD DISK DRIVE COMPRISING THE SAME

BACKGROUND OF THE INVENTION

1. Field of the Invention

The present invention relates to a hard disk drive. More particularly, the present invention relates to a voice coil motor (VCM) of a hard disk drive.

2. Description of Related Art

Hard disk drives (HDDs) are widely used as auxiliary memory devices of computer systems because of their ability to rapidly access a large amount of data. HDDs do this by recording data on a disk or reproducing data from the disk using a read/write head. Recent advances in the development of HDDs have led to higher memory capacities, namely increased number of TPI (tracks per inch) and BPI (bits per inch). Accordingly, HDDs are being incorporated into greater numbers of electronic products. In particular, there is now a high demand for compact HDDs for use in portable electronic products such as notebooks, personal digital assistants (PDAs), and mobile phones. In this respect, a compact HDD whose disk has a diameter of 0.8 inches, i.e., a diameter similar to that of a coin, has been recently developed for use in mobile phones and MP3 players.

Figure 1:
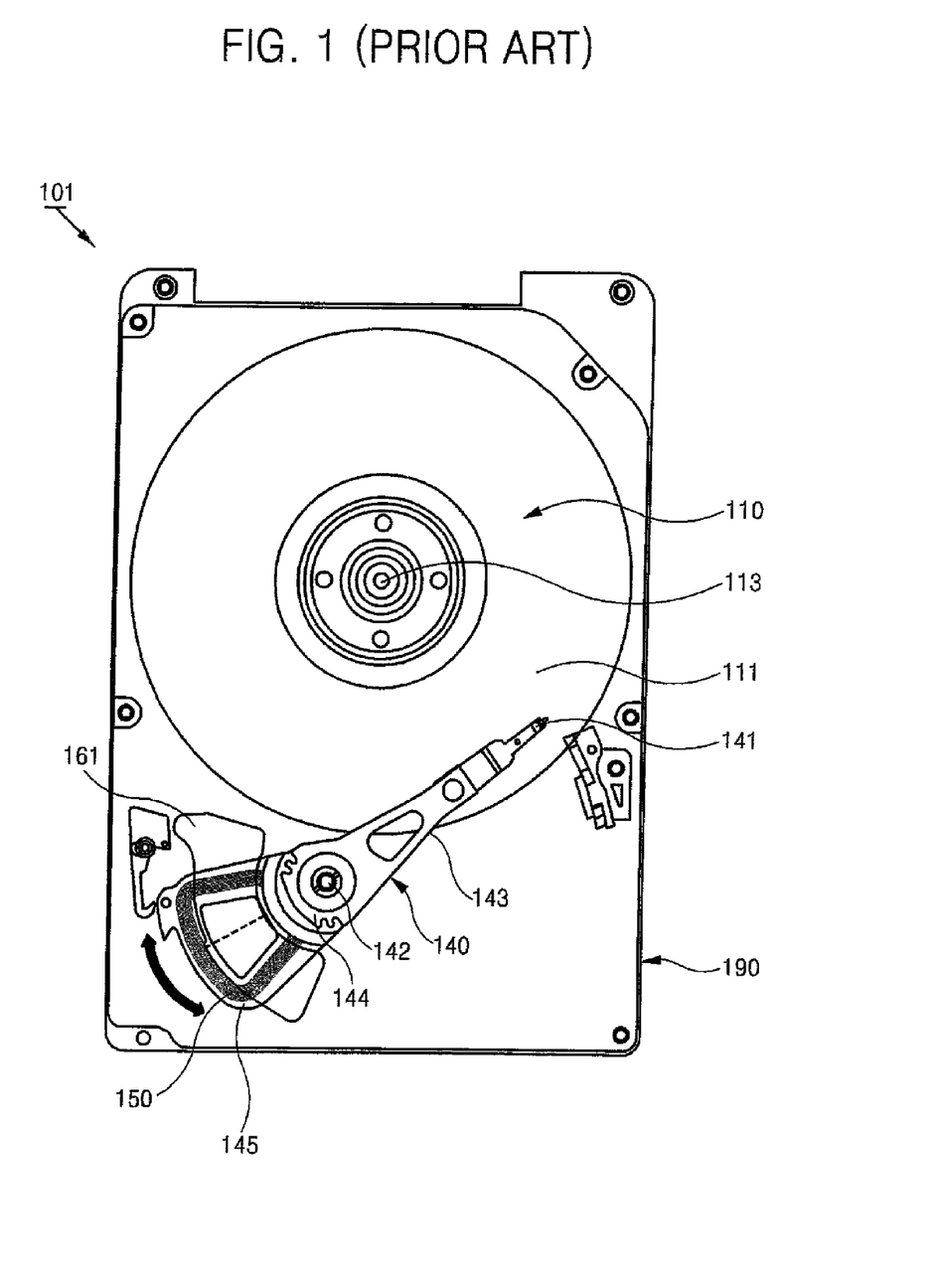
FIG. 1 is a plan view of an essential portion of a conventional hard disk drive.
Figure 2:
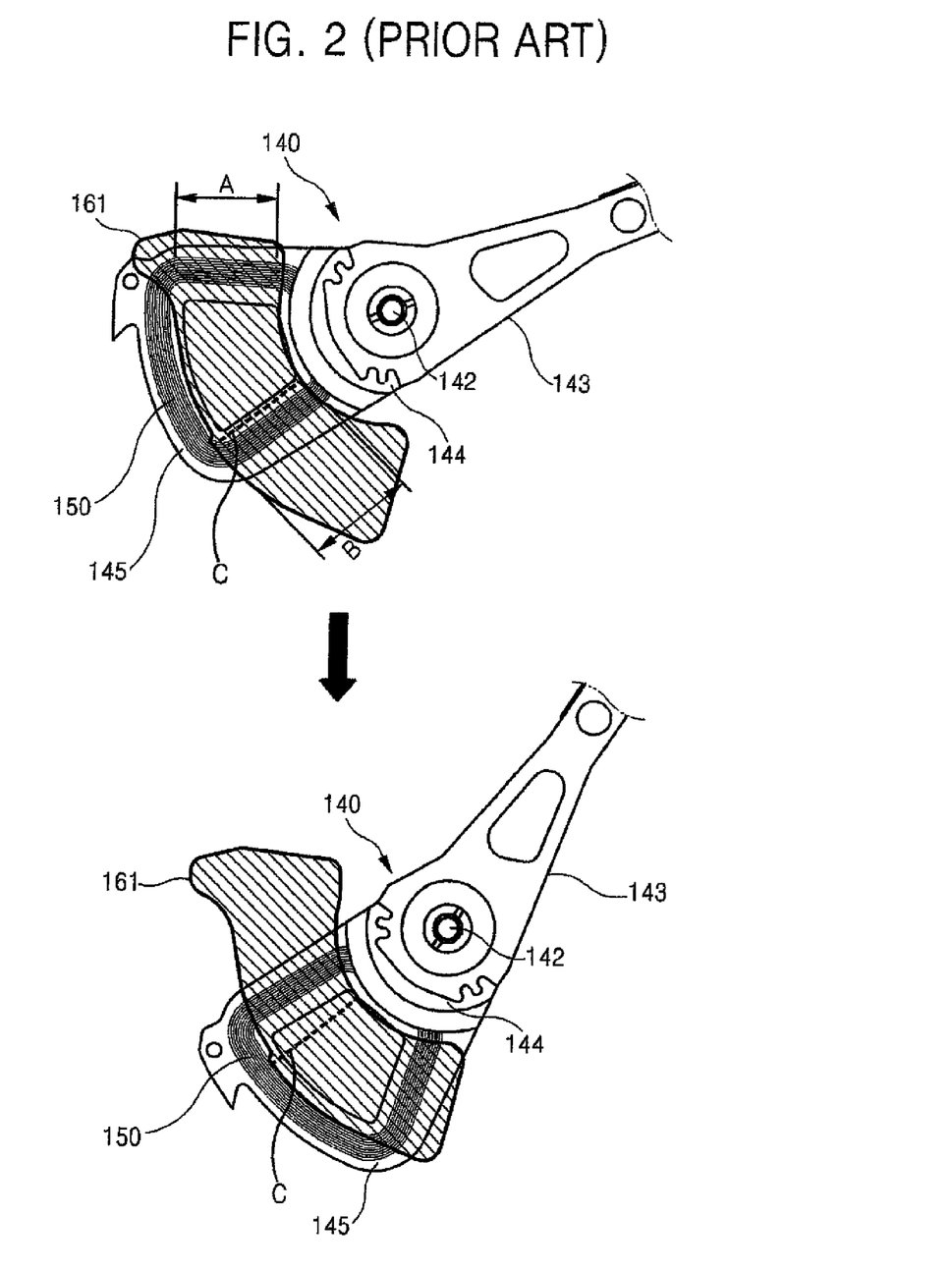
FIG. 2 comprises plan views of a head stack assembly (HSA) and voice coil motor (VCM) of the conventional hard disk drive and together illustrate the relative position of components of the same over the range of rotation of the HSA.

FIGS. 1 and 2 illustrate the structure of a conventional compact HDD. The conventional HDD 101 includes a disk pack 110 consisting of a disk 111 for recording data and a spindle motor (not shown) rotating the disk about an axis 113, a head stack assembly (HSA) 140, a voice coil motor (VCM), and a base 190 on which the aforementioned components are installed. The HSA 140 is rotated by the VCM about a shaft 142. The HSA 140 includes a read/write head 141 for recording data on the disk 111 or reading data from the disk 111, an actuator arm 143, a suspension coupled to an end of the actuator arm 143 and supporting the read/write head 141 so as to bias the head 141 toward the disk 111, a shaft holder 144 that receives the shaft 142 and from which the actuator arm 143 extends such that the actuator arm 143 is rotatable about the longitudinal axis of the shaft 142, and a bobbin 145 integral with the actuator arm 143 and extending from the other side of the shaft holder 144 opposite the actuator arm 143.

The VCM is used to rotate the actuator arm 143 and thereby move the read/write head 141 to a position over a desired location (track) on the disk 111. To this end, the VCM includes a voice coil 150 wound around the bobbin 145, magnets 161 disposed on opposite sides of the voice coil 150, respectively, and a VCM yoke (not shown) to which the magnets 161 are mounted. The VCM yoke helps concentrate the magnetic flux of the magnetic field generated by the magnets 161 across the VCM coil 150. The VCM thus operates according to Fleming's left hand rule, that is, a force is generated on the voice coil 150 (conductor) when current flows through the voice coil 150 within the magnetic field produced by the magnets 161.

Referring to FIG. 2, current flows through sections A and B of the voice coil 150 in respective directions that are opposite one another. The poles of the magnets 161 are arranged such that lines of the magnetic field produced by the magnets extend in opposite directions on opposite sides of a center line C of the magnets. Also, the center line C lies intermediate the sections A and B of the voice coil 150 throughout the entire range of rotation of the HSA 140. Thus, the forces exerted on the sections A and B of the voice coil act in the same direction. However, such magnets 161 having different magnetic poles with respect to their center line C are difficult to manufacture.

Also, as is clear from the description above, the VCM yoke to which the magnets 161 are attached must encompass the entire area over which the bobbin 145 can move when the HSA is driven by the VCM. Also, the voice coil 150 is wound around nearly the entire area of the upper surface of the bobbin 145. Accordingly, the magnets 161 must be relatively large. Furthermore, the magnets 161 must be spaced a relatively great distance from one another due to the thickness of the voice coil 150. Therefore, the VCM limits the degree to which the size and thickness of the HDD 101 can be minimized.

SUMMARY OF THE INVENTION

An object of the present invention is to provide a thin hard disk drive. In particular, one object of the present invention is to provide a head stack assembly that allows the VCM of the hard disk drive to be relatively thin.

Another object of the present invention is to provide a lightweight hard disk drive. In particular, one object of the present invention is to provide a hard disk drive having VCM that can operate using small magnets.

Yet another object of the present invention is to provide a hard disk drive that is low in cost to produce. In particular, one object of the present invention is to provide a head stack assembly whose VCM has a pair of magnets each consisting of a single pole piece.

According to an aspect of the present invention, there is provided a head stack assembly (HSA) of a hard disk drive, comprising: a swing arm, a read/write head supported by the swing arm, a bobbin integral with the swing arm, and a printed circuit board attached to and extending along the bobbin. The printed circuit board includes a substrate, and a conductive pattern supported by the substrate. The conductive pattern constitutes the conductor of the VCM of the hard disk drive.

According to another aspect of the present invention, there is provided a hard disk drive comprising a base, a disk pack mounted to the base, a head stack assembly (HSA) mounted to the base so as to be rotatable about an axis of rotation, and a voice coil motor (VCM) block 60 fixed to the base, wherein the HSA includes a swing arm, a read/write head supported by the swing arm, a bobbin integral with the swing arm, and a printed circuit board attached to and extending along the bobbin, and the VCM block includes magnets disposed above and below the bobbin, respectively. The printed circuit board includes a substrate, and a conductive pattern supported by the substrate. The magnets of the VCM block are oriented to produce a magnetic field across the conductive pattern such that an electromotive force is generated that rotates the HSA when current is flowing through the conductive pattern.

Preferably, the printed circuit board attached to the bobbin of the HSA is a flexible printed circuit board.

According to another aspect of the present invention, the printed circuit board is U-shaped and has a wide portion extending approximately radially with respect to the axis of rotation of the HSA, a narrow portion spaced from the wide portion and also extending approximately radially with respect to the axis of rotation of the HSA, and a connecting portion that connects the wide portion to the narrow portion and has approximately the shape of an arc centered about the axis of rotation of the HSA. The series of conductive traces extend along the wide portion of the flexible printed circuit board, and the series of conductive traces have an overall width that is less than that of the narrow portion as measured in a direction concentric with the axis of rotation of the HSA.

In this case, the magnets of the VCM of the hard disk drive each consist of a single pole piece, and the polarity of the magnet disposed above the bobbin is opposite the polarity of the magnet disposed below the bobbin.

According to another aspect of the present invention, the flexible printed circuit board is U-shaped and has a first wide portion extending approximately radially with respect to the axis of rotation of the HSA, a second wide portion spaced from the first wide portion and also extending approximately radially with respect to the axis of rotation of the HSA, and a connecting portion that connects the wide portions to one another and has approximately the shape of an arc centered about the axis of rotation of the HAS. The first and second conductive patterns extend along the first and second wide portions of the flexible printed circuit board, respectively.

In this case, each of the magnets of the VCM of the hard disk drive has opposite poles disposed side-by-side. Also, each of the poles of the magnet disposed above the bobbin is juxtaposed with a pole, of the opposite polarity, of the magnet disposed below the bobbin.

BRIEF DESCRIPTION OF THE DRAWINGS

The above and/or other objects, aspects and advantages of the present invention will become apparent and more readily appreciated from the following detailed description made in conjunction with the accompanying drawings of which.

DETAILED DESCRIPTION OF THE PREFERRED EMBODIMENTS

Figure 3:
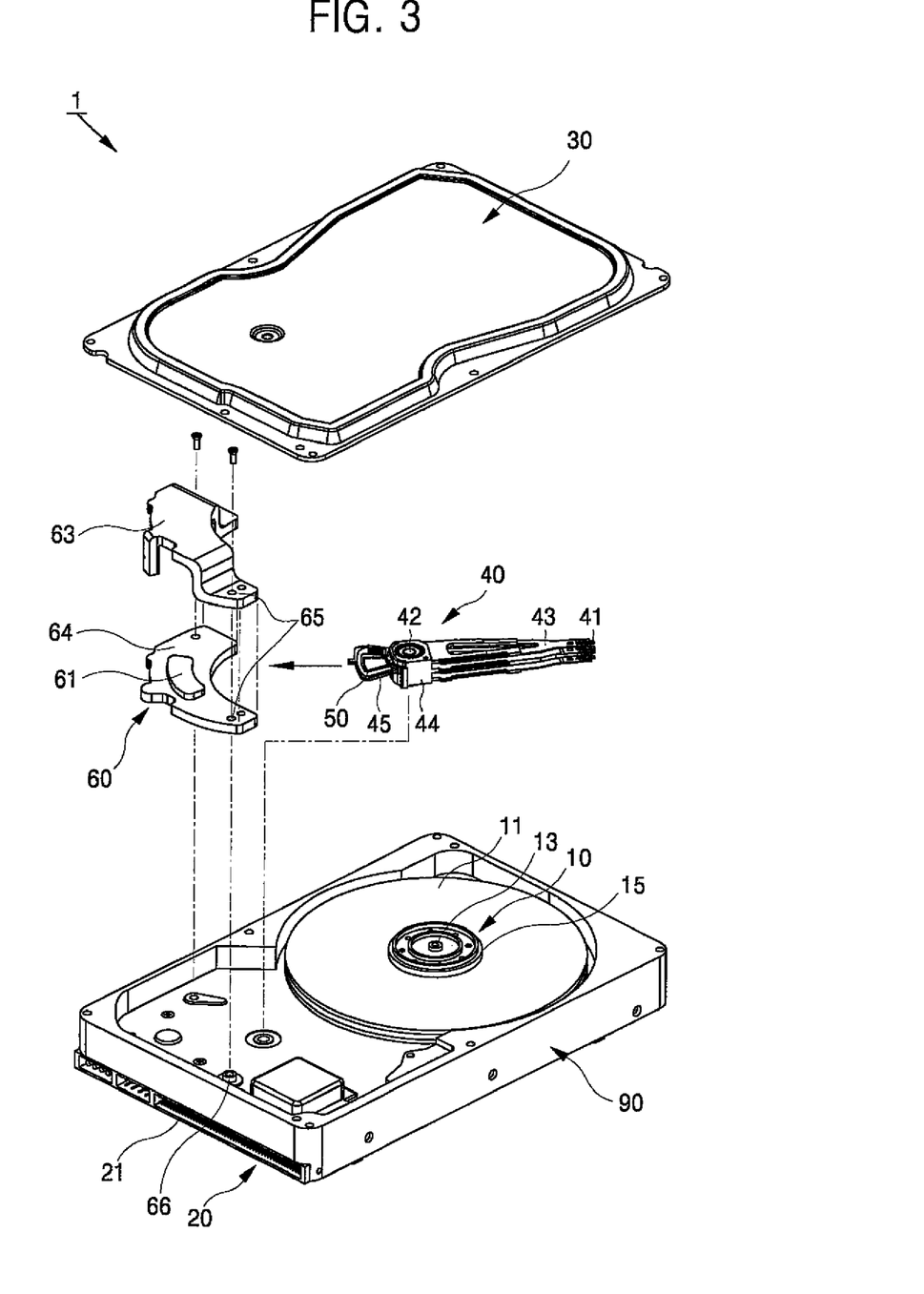
FIG. 3 is an exploded perspective view of a hard disk drive according to the present invention.
Figure 4:
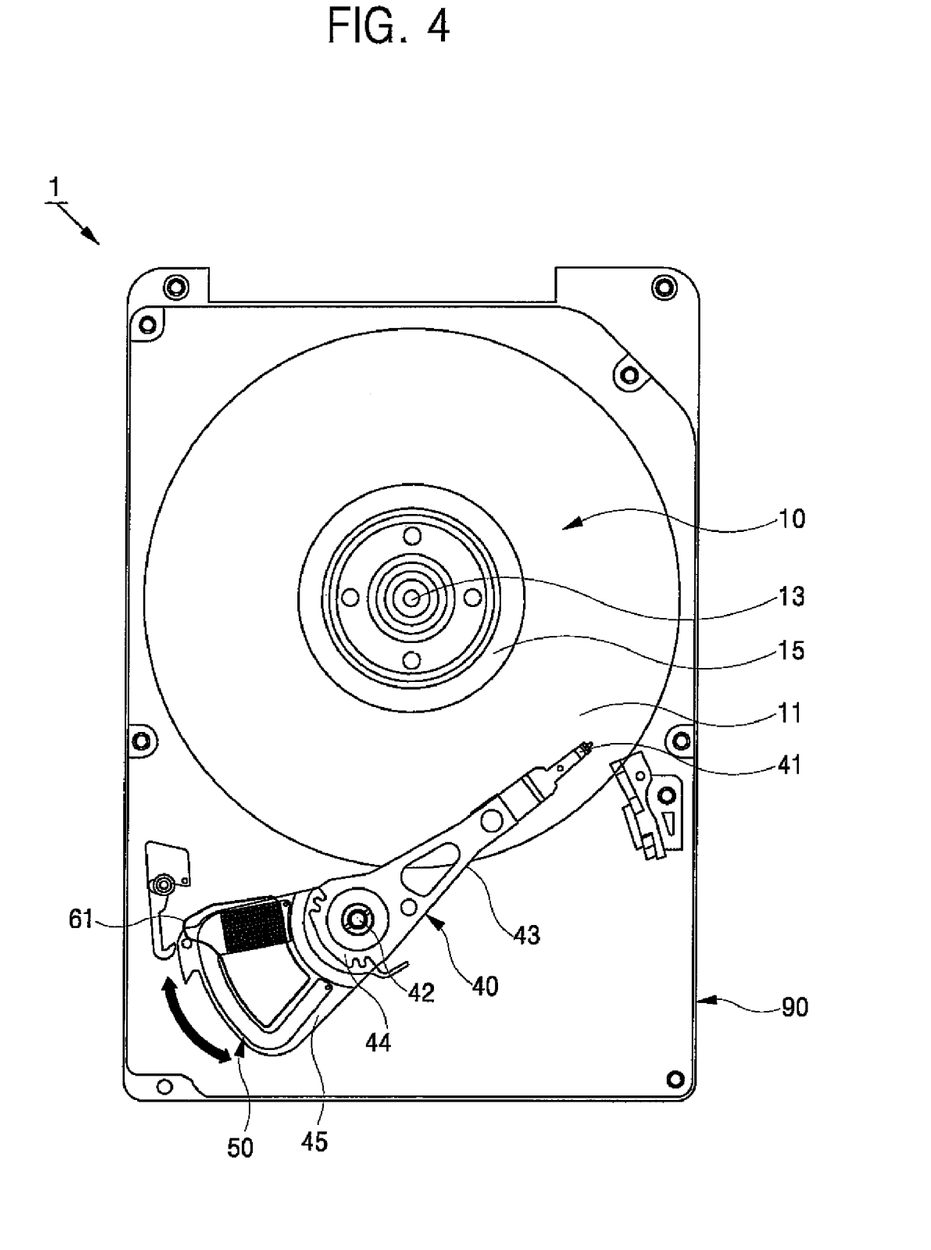
FIG. 4 is a plan view of the bottom section of the hard disk drive of FIG. 3.

A first embodiment of the present invention will now be described in more detail with reference to FIGS. 3, 4, 5, 6, and 7. Referring first to FIGS. 3 and 4, a hard disk drive (HDD) 1 according to the present invention includes a disk pack 10, a printed circuit board assembly (PCBA) 20, a cover 30, a head stack assembly (HSA) 40, a voice coil motor (VCM) block 60, and a base 90 to which the cover 90 is coupled. The base 90 supports the disk pack 10, PCBA 20, and the VCM block 60. The cover 30 protects the disk pack 10 and the HSA 40.

The disk pack 10 includes at least one disk 11, a spindle motor having spindle motor hub (not shown) supporting the disk 11 and a shaft 13 concentric with the spindle motor hub, a clamp 15 disposed on the shaft 13, and clamp screws coupling the clamp 15 to the spindle motor hub such that the clamp 15 clamps disk 11 to the spindle motor hub. Thus, the disk 11 is rotated by the spindle motor about the central longitudinal axis of shaft 13.

The PCBA 20 includes a PCB (not shown) and a PCB connector 21 provided at one side of and electrically connected to the PCB. Chips (not shown) mounted on the PCB control the spindle motor and the HSA 40. Signals are transmitted to or from the HDD 1 via the PCB connector 21.

The HSA 40 includes a read/write head 41 for recording data on the disk 11 or reading data from the disk 11, an actuator arm 43, a suspension coupled to an end of the actuator arm 43 and supporting the read/write head 41 so as to bias the head 41 toward the disk 11, a shaft holder 44 that receives a shaft 42 and from which the actuator arm 43 extends such that the actuator arm 43 is rotatable about the longitudinal axis of the shaft 42, and a bobbin 45 integral with the actuator arm 43 and extending from the other side of the shaft holder 44 opposite the actuator arm 43. The HSA 40 also includes a flexible printed circuit board assembly (FPCB) 50 mounted to the bobbin 45. The read/write head 41 consists of a read head for reproducing data recorded on the disk 11 and a write head for recording data onto the disk 11. More specifically, the read head is operable to detect the magnetization of the surface of the disk 11 and the write head operable to magnetize the surface of the disk 11. The pattern of the magnetization detected or produced represents the data.

Figure 5:
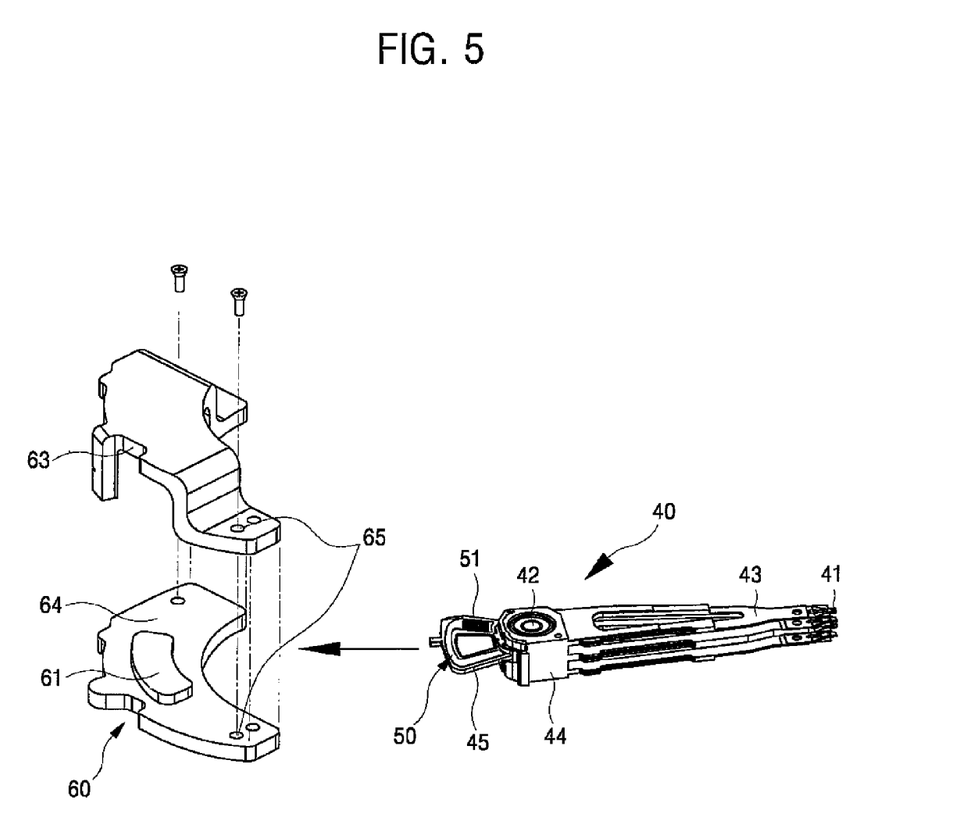
FIG. 5 is an exploded perspective view of the major portion of the hard disk drive of FIG. 3.

The VCM block 60 and the flexible printed circuit board 50 (FPCB) make up a voice coil motor (VCM) that rotates the actuator arm 43 about the axis of shaft 42 to position the read/write head 41 over a desired location (track) on the disk 11. The VCM block 60, as best shown in FIGS. 3 and 5, includes upper and lower VCM yokes 63 and 64 fixed to the base 90, and a pair of magnets 61 supported by the VCM yokes 63 and 64 above and below the bobbin 45, respectively. More specifically, one of the magnets 61 is fixed to a lower surface of the upper VCM yoke 63 so as to be supported above the bobbin 45. The other of the magnets 61 is fixed to an upper surface of the lower VCM yoke 64 so as to be supported below the bobbin 45. The VCM yokes 63 and 64 not only support the magnets 61 but help confine the magnetic field produced by the magnets 61 to the space in which the bobbin 45 and FPCB 50 are located. Also, both sides of the upper and lower VCM yokes 63 and 64 have tapped through holes 65. The base 90 has tapped holes 66 corresponding to the through holes 65 of the VCM yokes 63 and 64. The upper and lower VCM yokes 63 and 64 are fixed to the base 90 by screws provided in the through holes 65 of the yokes 63 and 64 and the corresponding holes 66 in the base 90.

The FPCB 50 includes a flexible substrate attached to the upper surface of the bobbin 45, and a conductive pattern supported by the substrate and through which current is supplied. Preferably the FPCB 50 is bonded to the upper surface of the bobbin 45 using an adhesive, although other means of attaching the FPCB 50 to the bobbin 45 may be used. Also, the conductive pattern of the FPCB 50 can be formed by etching a conductive layer formed on the substrate or by punching out a pattern from a plate and bonding the pattern to the substrate. As was mentioned above in connection with the description of the related art, the VCM operates according to Fleming's left hand rule. That is, an electromotive force is generated on the FPCB 50 when a current flows through the conductive pattern thereof within the magnetic field produced by magnets 61. The electromotive force is transmitted to the bobbin 45, to which the FPCB 50 is attached, in a direction that rotates the HSA 40 about the axis of shaft 42 and thereby moves the read/write head 41 over the disk 11.

Figure 6:
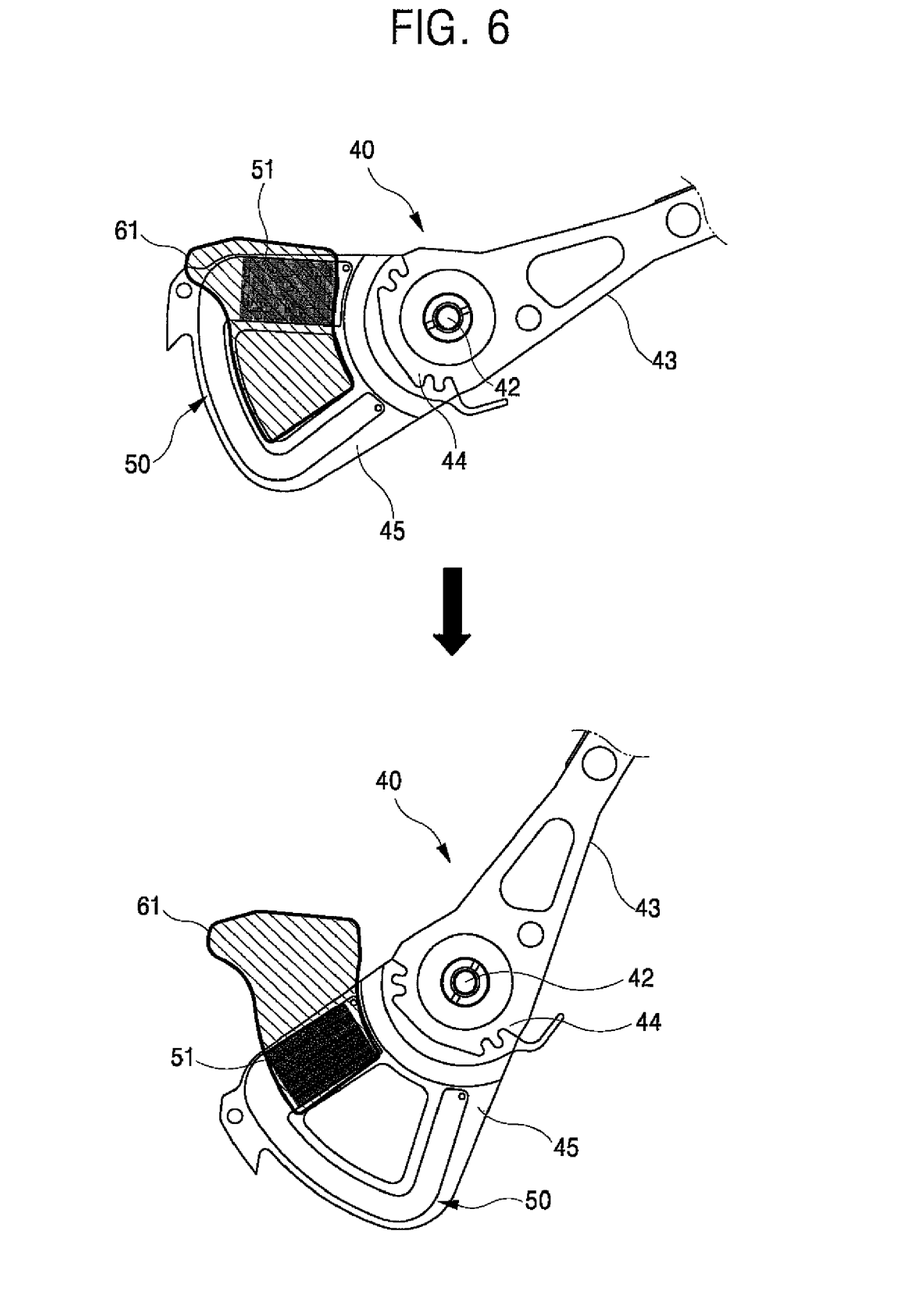
FIG. 6 comprises plan views of a head stack assembly (HSA) and voice coil motor (VCM) of the hard disk drive according to the present invention and together illustrate the relative position of components of the same over the range of rotation of the HSA.
Figure 7:
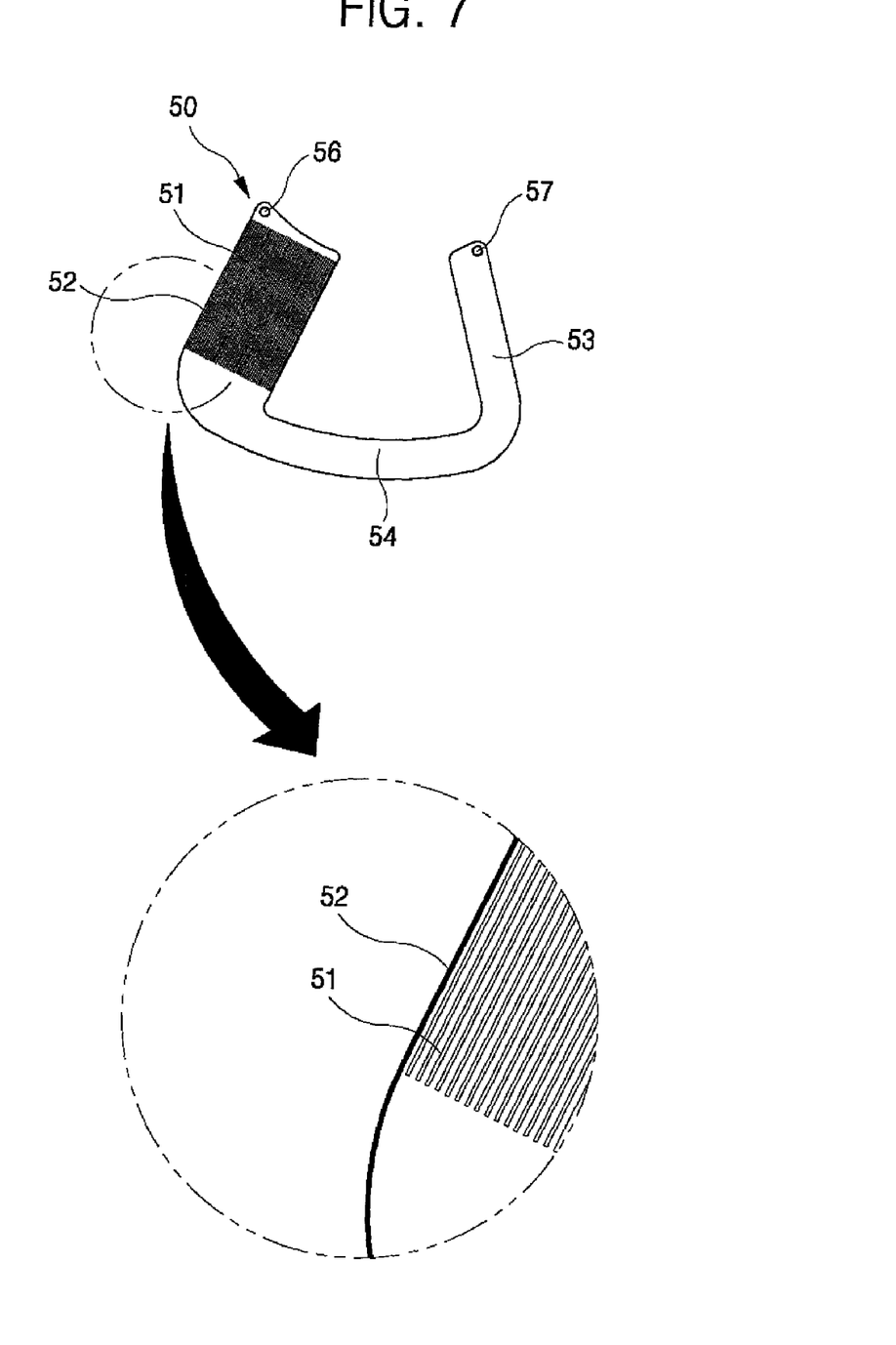
FIG. 7 comprises a plan view of a flexible printed circuit board (FPCB) of the VCM shown in FIG. 5 and an enlarged view of a portion of the FPCB.

As shown best in FIGS. 6 and 7, the FPCB 50 has a shape similar to the outline of the bobbin 45, that is, a U shape. More specifically, the FPCB 50 has a wide portion 52 extending approximately radially with respect to the longitudinal axis about which the HSA rotates, a narrow portion 53 (i.e., a portion narrower than that of the wide portion 52) spaced from the wide portion 52 and also extending approximately radially with respect to the longitudinal axis about which the HSA rotates, and a connecting portion 54 that connects the wide portion 52 to the narrow portion 53 and has approximately the shape of an arc centered about the axis of rotation of the HSA. The wide portion 52 includes a conductive pattern of traces (lines) 51, the narrow portion 53 forms a conductive path that is narrower than that of the conductive pattern of traces 51, and the connecting portion 54 forms a conductive path that has generally the same width as that provided by the narrow portion 53 and electrically connects the traces 51 of the wide portion 52 to the conductive path formed by the narrow portion 53. The wide portion 52 of the FPCB 50 also includes an electric terminal 56 connected to the traces 51, and the narrow portion 53 of the FCB 50 includes an electric terminal 57. The terminals 56 and 57 are disposed at both ends of the FPCB 50. Thus, current can be supplied through the conductive traces 51 via the terminals 56 and 57.

The traces 51 extend parallel to one another in the lengthwise direction of the wide portion 52 of the FPCB 50, and are thus paced from one another in the widthwise direction of the wide portion 52. The traces 51 are also connected to one another in parallel. Also, the conductive traces 51 have an overall width that is less than that of the narrow portion 53. As used above, the term width refers to a measurement taken in a direction concentric with the axis of rotation of the HSA. The number of traces 51 is designed for to provide the desired amount of electromotive force for rotating the HSA 40. The electromotive force can be calculated according to Faraday's Law of Induction:

$$\epsilon = -N \times d\phi/dt$$

where $\epsilon$ is the electromotive force, N is the number of windings of a coil, and $d\phi/dt$ is the rate of change of the magnetic flux through the coil. Accordingly, the electromotive force generated by the conductive pattern of traces 51 in the magnetic field produced by the magnets 61 is proportional to the number of traces 51. Also, several of the FPCBs 50 can be stacked on the bobbin 45 between the magnets 61 to provide even a greater electromotive force. The number of traces 51 of each FPCB 50, and the number of FPCBs stacked on the bobbin can be designed such that the total electromotive force will rotate the HSA 40 smoothly about the longitudinal axis of shaft 42.

Referring now to FIG. 6, each of the magnets 61 has one magnetic pole, i.e., consists of a pole piece. However, the poles of the magnets disposed above and below the bobbin 45, to which the FPCB 50 is attached, are opposite. Thus, according to Fleming's left hand rule, an electromotive force acts on the conductive pattern 51 in a direction corresponding to the direction of the current flowing through the traces 51. Accordingly, the HSA 40 will rotate in one direction about the longitudinal axis of shaft 42 when current is supplied to the FPCB 50 via the terminal 57 at the end of the narrow portion 53 (and flows out through the terminal 56 formed at the end of the wide portion 52). On the other hand, the HSA 40 will rotate in the other direction about the longitudinal axis of shaft 42 when current is supplied to the FPCB 50 via the terminal 56 formed at the end of the wide portion 52 (and flows out through the terminal 57 at the end of the narrow portion 53).

Moreover, as shown in FIG. 6, the magnets 61 only encompass the area over which the wide portion 52 of the FPCB 50 ranges during rotation of the HSA 40. That is, the magnets 61 do not need to encompass the entire area over which the bobbin 45 moves, as distinguished from the conventional HDD. Therefore, the magnets 61 can be about half the size as those employed in the conventional HDD. Accordingly, a comparatively lightweight HDD can be realized according to the present invention. Also, the magnets 61 are easy and economical to manufacture because each of the magnets 61 consists of a single pole piece.

Also, the FPCB 50 is thinner than a VCM coil of the conventional HDD. Therefore, a comparatively thin and compact HDD can be realized according to the present invention. Still further, the FPCB 50 is highly resistant to heat so that the FPCB 50 will not be damaged by the heat generated during the operation of the HDD 1. In this respect, the FPCB 50 is more durable than and provides superior performance compared to the coil of the VCM of the conventional HDD.

Figure 8:
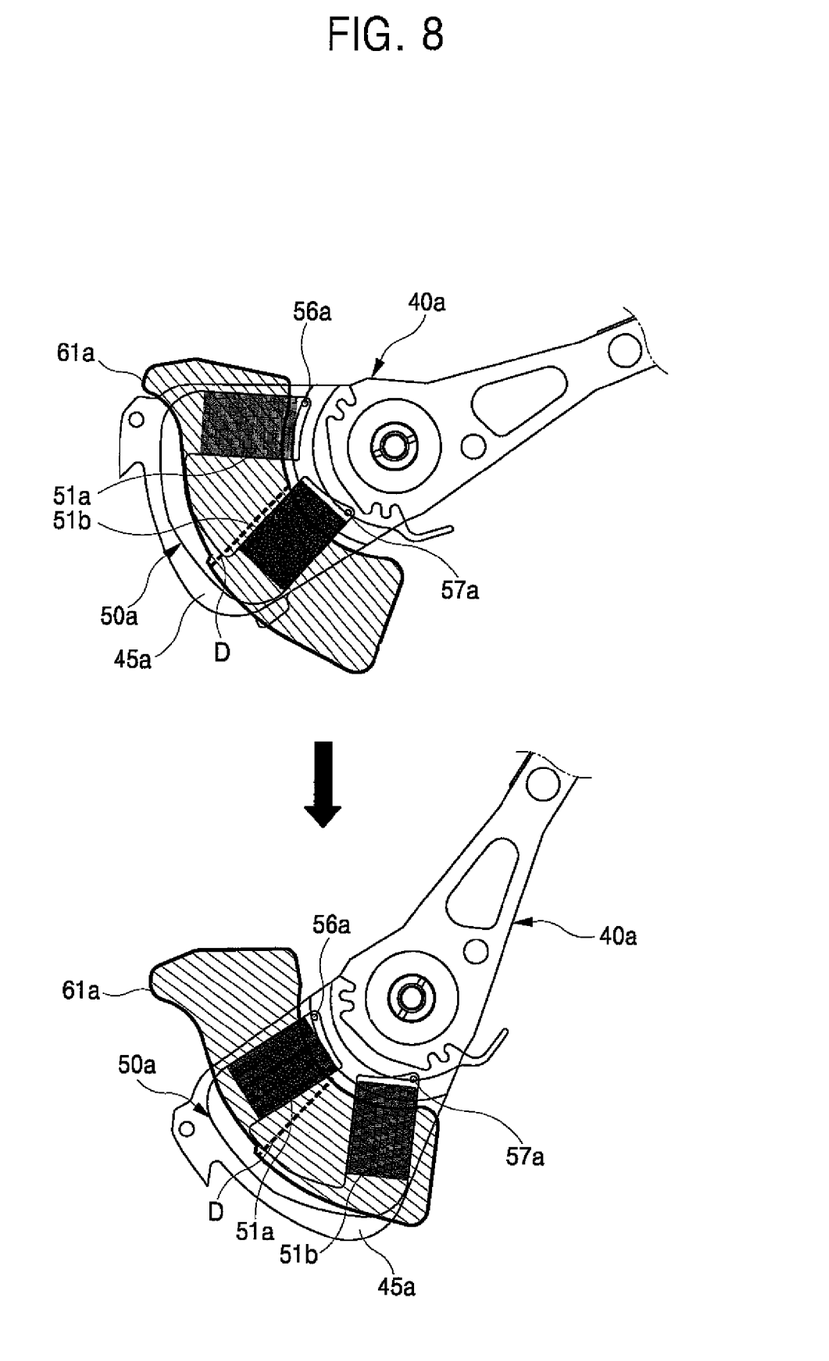
FIG. 8 comprises views similar to those of FIG. 6 but of another embodiment of an HDD according to the present invention.
Figure 9:
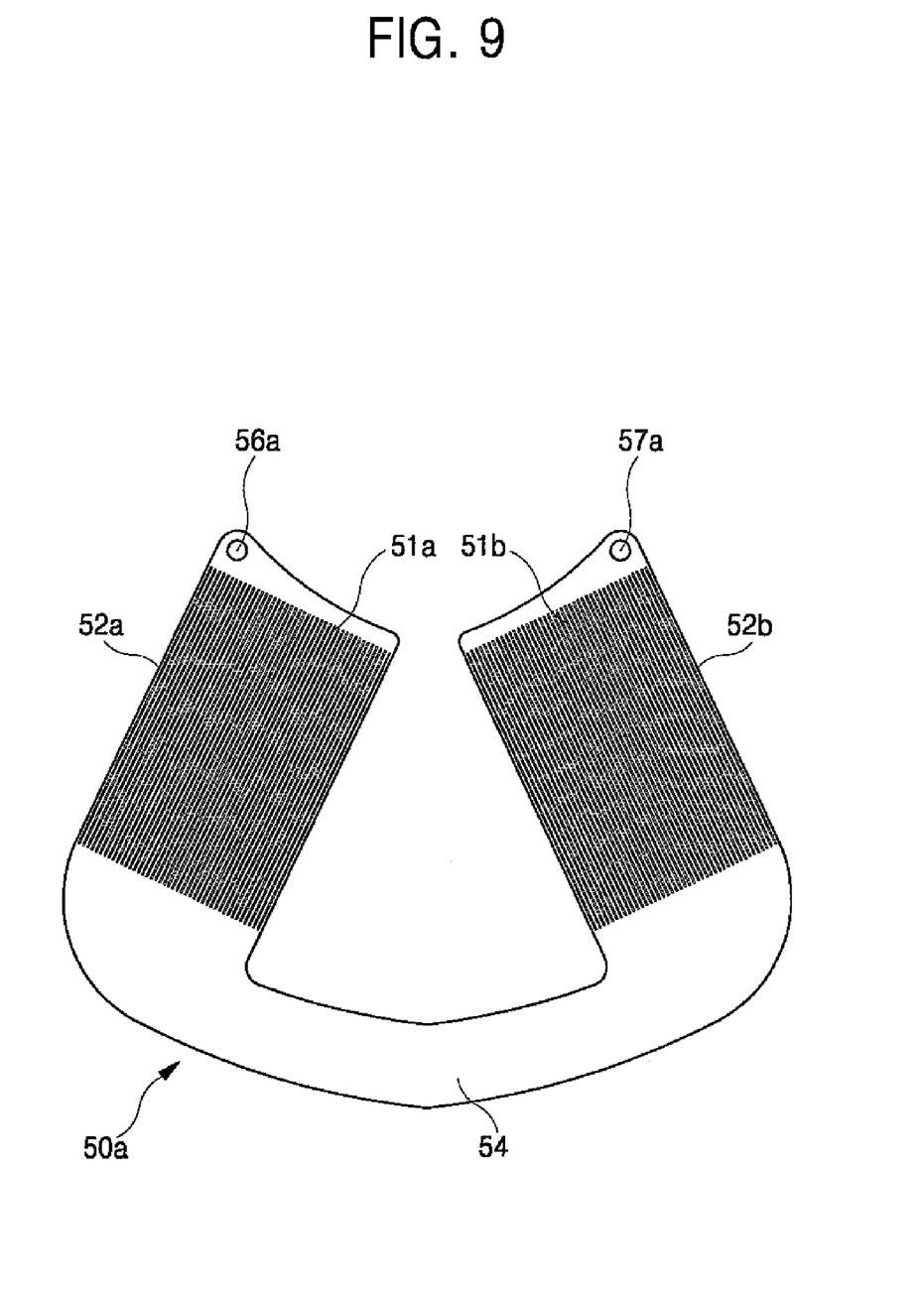
FIG. 9 is a plan view of the FPCB of the embodiment shown in FIG. 8.

Another embodiment of an HDD according to the present invention will be described with reference to FIGS. 8 and 9. FIGS. 8 and 9 only illustrate the structure of the HSA and VCM of the hard disk drive. The remaining components are the same as those illustrated and described above in connection with FIGS. 3 and 4. Also, those aspects of the second embodiment which are substantially the same as those of the first embodiment will not be described in detail for the sake of brevity.

Referring now to FIGS. 8 and 9, an HSA 40a has a bobbin 45a and an FPCB 50a attached to the bobbin 45a. The FPCB 50a has a first wide portion 52a, a second wide portion 52b spaced from the first wide width portion 52a, and a connecting portion 54a connecting the first and second wide portions 52a and 52b. The first wide portion 52a of the FPCB 50a includes a first conductive pattern (series) of traces 51a and a first terminal 56a connected to the first conductive pattern of traces 51a, the second wide portion 52b includes a second conductive pattern (series) of traces 51b and a second terminal 57a connected to the second conductive pattern of traces 51b, and the connecting portion 54a provides a narrow conductive path electrically connecting the first and second conductive patterns of traces 51a and 51b in series. The conductive path provided by the connecting portion 54a is narrower than each of the conductive patterns of traces 51a and 51b.

A VCM block of the HDD includes magnets 61a respectively disposed above and below the bobbin 45a. Each of the magnets 61a has opposite magnetic poles disposed side-by-side with respect to a center line D of the magnet, respectively. Also, the magnets 61a are arranged so that each magnetic pole of the magnet 61a disposed above the bobbin 45a is juxtaposed with a pole, having the opposite polarity, of the magnet 61a disposed below the bobbin 45a. For example, in the embodiment shown in FIG. 8, the magnet 61a disposed above the bobbin 45a has N and S poles to the left and right of the center line D. On the other hand, the magnet 61a disposed under the bobbin 45a has S and N poles to the left and right of the center line D.

Thus, current supplied to the FPCB 50a through one of the terminals 56a, 57a flows in opposite directions through the first and second conductive patterns 51a and 51b and out the other of the terminals 56a and 57a. However, the magnetic fields provided by the magnets 61 across the first and second conductive patterns 51a and 51b, respectively, are in opposite directions. Thus, an electromotive force acting in one direction is transmitted to the HSA 40a even though the current flows through the first and second conductive patterns 51a and 51b in opposite directions. Also, each pole of a magnet 61 encompasses the entire range of motion of a respective one of the first and second conductive patterns 51a and 51b to provide the desired control over the rotation of the HSA 40a.

The HDD according to the embodiment of FIGS. 8 and 9 has merit in that the VCM can be comparatively thin because the FPCB 50a that provides the conductor of the VCM is relatively flat and thin. As was also mentioned above in connection with the first embodiment, the FPCB 50a is highly resistant to heat so that the FPCB 50a will not be damaged by the heat generated during the operation of the HDD 1.

Finally, although the present invention has been described in connection with the preferred embodiments thereof, it is to be understood that the scope of the present invention is not so limited. On the contrary, various modifications of and changes to the preferred embodiments will be apparent to those of ordinary skill in the art. Thus, changes to and modifications of the preferred embodiments may fall within the true spirit and scope of the invention as defined by the appended claims.

What is claimed is:

1. A head stack assembly (HSA) of a hard disk drive, the assembly comprising:
   a swing arm;
   a read/write head supported by the swing arm at one end of the HSA;
   a bobbin integral with the swing arm and constituting the other end of the HSA, the swing arm and the bobbin being disposed on opposite sides of an axis of rotation of the HSA; and
   a printed circuit board attached to and extending along the bobbin, the printed circuit board including a substrate, and a conductive pattern supported by the substrate,
   wherein the conductive pattern comprises a series of conductive traces that extend parallel to one another and approximately radially with respect to the axis of rotation of the HSA,
   the conductive traces are electrically connected to one another in parallel, and
   the printed circuit board is U-shaped and has a wide portion extending approximately radially with respect to the axis of rotation of the HSA, a narrow portion spaced from the wide portion and also extending approximately radially with respect to the axis of rotation of the HSA, and a connecting portion that connects the wide portion to the narrow portion and has approximately the shape of an arc centered about the axis of rotation of the HSA, the series of conductive traces extending along the wide portion of the flexible printed circuit board, and the series of conductive traces having an overall width that is less than that of the narrow portion as measured in a direction concentric with the axis of rotation of the HSA.

2. The head stack assembly of claim 1, wherein the printed circuit board has electrical terminals at ends of the wide and narrow portions, respectively.

3. The head stack assembly of claim 1, wherein the printed circuit board is a flexible printed circuit board in which the substrate comprises a flexible ribbon of material.

4. A hard disk drive comprising the HSA as claimed in claim 1, a base to which the HSA is mounted so as to be rotatable about said axis of rotation, a disk pack mounted to the base, and a voice coil motor (VCM) block fixed to the base,
   wherein the disk pack includes at least one disk and a spindle motor to which the disk is mounted, and
   the VCM block including magnets disposed on opposite sides of the bobbin, respectively, such that the bobbin is interposed between the magnets, and wherein the magnets are oriented to produce a magnetic field across the conductive pattern such that an electromotive force is generated that rotates the HSA about the axis of rotation thereof when current is flowing through the conductive pattern of the printed circuit board attached to the bobbin of the HSA.

5. The hard disk drive of claim 4, wherein the printed circuit board attached to the bobbin of the HSA is a flexible printed circuit board in which the substrate comprises a flexible ribbon of material.

6. The hard disk drive of claim 4, wherein the printed circuit board has electrical terminals at ends of the wide and narrow portions, respectively.

7. A head stack assembly (HSA) of a hard disk drive, the assembly comprising:
   a swing arm;
   a read/write head supported by the swing arm at one end of the HSA;
   a bobbin integral with the swing arm and constituting the other end of the HSA, the swing arm and the bobbin being disposed on opposite sides of an axis of rotation of the HSA; and
   a printed circuit board attached to and extending along the bobbin, the printed circuit board including a substrate, and a conductive pattern supported by the substrate,
   wherein the conductive pattern includes first and second patterns of conductive traces, the traces of each of the first and second patterns extending parallel to one another and electrically connected to one another in parallel, and the first and second conductive patterns are electrically connected to one another in series.

8. The head stack assembly of claim 7, wherein the conductive traces of each of the first and second conductive patterns extend approximately radially with respect to the axis of rotation of the HSA.

9. The head stack assembly of claim 8, wherein the printed circuit board is U-shaped and has a first wide portion extending approximately radially with respect to the axis of rotation of the HSA, a second wide portion spaced from the first wide portion and also extending approximately radially with respect to the axis of rotation of the HSA, and a connecting portion that connects the wide portions to one another and has approximately the shape of an arc centered about the axis of rotation of the HSA, the first and second conductive patterns extending along the first and second wide portions of the flexible printed circuit board, respectively.

10. The head stack assembly of claim 9, wherein the printed circuit board has electrical terminals at ends of the first and second wide portions, respectively.

11. The head stack assembly of claim 7, wherein the printed circuit board is a flexible printed circuit board in which the substrate comprises a flexible ribbon of material.

12. A hard disk drive comprising the HSA as claimed in claim 7, a base to which the HSA is mounted so as to be rotatable about said axis of rotation, a disk pack mounted to the base, and a voice coil motor (VCM) block fixed to the base,
   wherein the disk pack includes at least one disk and a spindle motor to which the disk is mounted, and the VCM block including magnets disposed on opposite sides of the bobbin, respectively, such that the bobbin is interposed between the magnets, and wherein the magnets are oriented to produce a magnetic field across the conductive pattern such that an electromotive force is generated that rotates the HSA about the axis of rotation thereof when current is flowing through the conductive pattern of the printed circuit board attached to the bobbin of the HSA.

13. The hard disk drive of claim 12, wherein the conductive traces of each of the first and second conductive patterns extend approximately radially with respect to the axis of rotation of the HSA.

14. The hard disk drive of claim 13, wherein the flexible printed circuit board is U-shaped and has a first wide portion extending approximately radially with respect to the axis of rotation of the HSA, a second wide portion spaced from the first wide portion and also extending approximately radially with respect to the axis of rotation of the HSA, and a connecting portion that connects the wide portions to one another and has approximately the shape of an arc centered about the axis of rotation of the HSA, the first and second conductive patterns extending along the first and second wide portions of the flexible printed circuit board, respectively, and wherein each of the magnets comprises opposite poles disposed side-by-side, and each of the poles of the magnet disposed on one side of the bobbin is juxtaposed with a pole, of the opposite polarity, of the magnet disposed on the other side of the bobbin.

15. The hard disk drive of claim 14, wherein the printed circuit board has electrical terminals at ends of the first and second wide portions, respectively.

* * * * *